United States Patent
Seroka

(10) Patent No.: US 9,522,509 B2
(45) Date of Patent: Dec. 20, 2016

(54) TIRE MOLD VENT

(71) Applicant: Bridgestone Americas Tire Operations, LLC, Nashville, TN (US)

(72) Inventor: Edward S. Seroka, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/109,180

(22) PCT Filed: Jan. 7, 2015

(86) PCT No.: PCT/US2015/010401
§ 371 (c)(1),
(2) Date: Jun. 30, 2016

(87) PCT Pub. No.: WO2015/105821
PCT Pub. Date: Jul. 16, 2015

(65) Prior Publication Data
US 2016/0325516 A1    Nov. 10, 2016

Related U.S. Application Data

(60) Provisional application No. 61/925,249, filed on Jan. 9, 2014.

(51) Int. Cl.
*B29C 33/10* (2006.01)
*B29D 30/06* (2006.01)
*B29K 621/00* (2006.01)

(52) U.S. Cl.
CPC ............ *B29D 30/0606* (2013.01); *B29C 33/10* (2013.01); *B29D 2030/0617* (2013.01); *B29K 2621/00* (2013.01)

(58) Field of Classification Search
CPC ................... B29D 30/0606; B29D 2030/0617; B29C 33/10
See application file for complete search history.

(56) References Cited

U.S. PATENT DOCUMENTS

| 4,708,609 A | * | 11/1987 | Yoda | ....... B29C 33/10 |
| | | | | 249/102 |
| 4,759,701 A | * | 7/1988 | Carter | ....... B29C 33/10 |
| | | | | 425/28.1 |

(Continued)

FOREIGN PATENT DOCUMENTS

| CN | 101360594 A | 2/2009 |
| CN | 201559271 U | 8/2010 |

(Continued)

OTHER PUBLICATIONS

Written Opinion of the International Searching Authority in corresponding International Application No. PCT/US2015/010401, dated Apr. 17, 2015, 5 pp. (not prior art).

*Primary Examiner* — James Mackey

(57) ABSTRACT

A tire mold vent assembly includes a cylindrical vent housing having a slot defined therein along the length of the housing to provide a circumferential flexibility to the vent housing. An elastomeric insert is received in the slot and includes a head extending laterally from one end of the housing. The head is movable between a first position permitting air flow into the passage through the housing, and a second position which blocks the passage to prevent sprue formation.

24 Claims, 6 Drawing Sheets

(56) References Cited

U.S. PATENT DOCUMENTS

| | | | | |
|---|---|---|---|---|
| 5,059,380 | A | * | 10/1991 | Wise ................ B29C 33/10 249/141 |
| 5,283,022 | A | | 2/1994 | Bartley |
| 5,939,101 | A | * | 8/1999 | Green ................ B29C 33/10 249/141 |
| 6,805,540 | B2 | | 10/2004 | Ishihara |
| 7,530,803 | B2 | | 5/2009 | Seroka |
| 7,607,908 | B2 | | 10/2009 | Seroka |
| 7,645,131 | B2 | | 1/2010 | Hajdúch |
| 7,811,078 | B2 | * | 10/2010 | Serener-Thielmann B29C 33/10 249/141 |
| 7,896,643 | B2 | * | 3/2011 | Serener-Thielmann B29C 33/10 249/141 |
| 8,221,106 | B2 | * | 7/2012 | Serener-Thielmann B29D 30/0606 425/28.1 |
| 8,342,830 | B2 | | 1/2013 | Sugata |
| 2002/0127292 | A1 | | 9/2002 | Gallinotti et al. |
| 2004/0005371 | A1 | | 1/2004 | Ahn et al. |
| 2007/0278707 | A1 | | 12/2007 | Koberlein |
| 2008/0088057 | A1 | | 4/2008 | Henrotte et al. |
| 2012/0256349 | A1 | | 10/2012 | Ohara |

FOREIGN PATENT DOCUMENTS

| | | | |
|---|---|---|---|
| CN | 102729366 | A | 10/2012 |
| EP | 1375105 | A2 | 1/2004 |
| JP | 2004082692 | A | 3/2004 |
| JP | 2006015626 | A | 1/2006 |
| JP | 2006103026 | A | 4/2006 |
| JP | 2006168191 | A | 6/2006 |
| JP | 2007062017 | A | 3/2007 |
| JP | 2007062235 | A | 3/2007 |
| JP | 2009160862 | A | 7/2009 |
| JP | 2009292012 | A | 12/2009 |
| WO | WO 2007/139523 | * | 12/2007 |

* cited by examiner

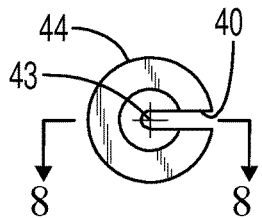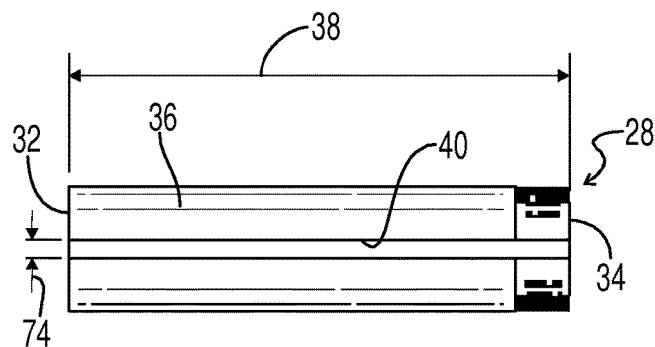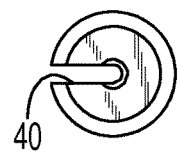
FIG. 6　　　　　FIG. 5　　　　　FIG. 7
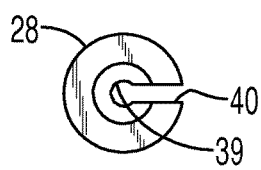
FIG. 6A
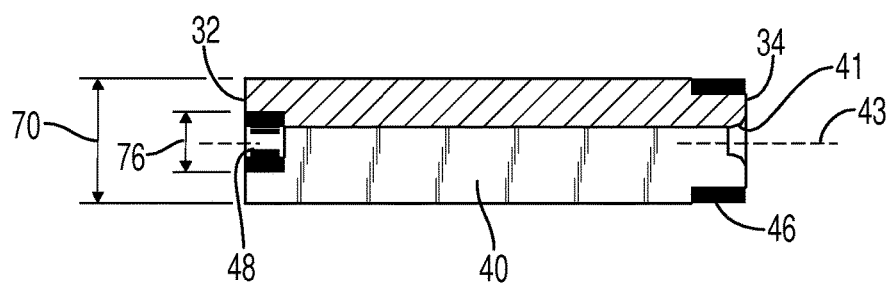
FIG. 8

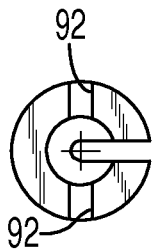
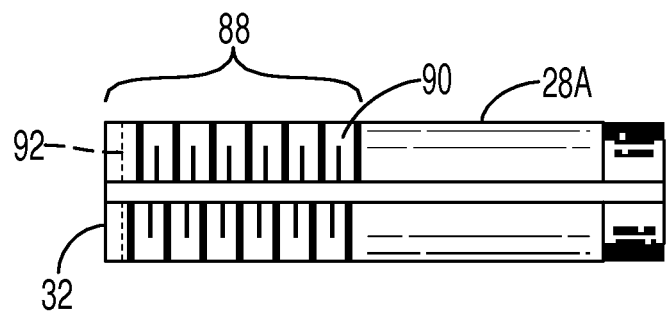
FIG. 15   FIG. 14
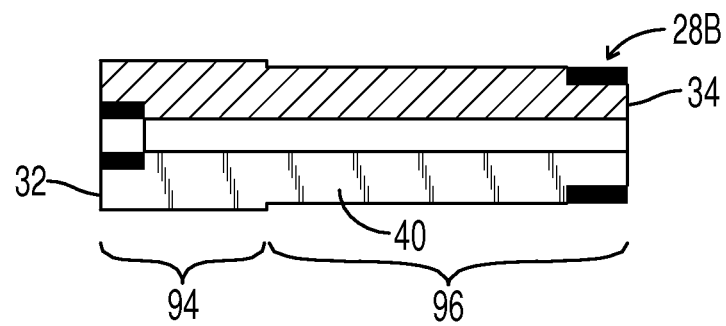
FIG. 16

TIRE MOLD VENT

BACKGROUND OF THE INVENTION

1. Field of the Invention

The present invention relates to a mold vent assembly for placement in a vent bore through the side of a tire mold or the like, to allow venting of air while inhibiting sprue formation.

2. Description of the Prior Art

During the curing cycle of a tire manufacturing process, air may become trapped between a green tire and a mold cavity when a tire molding press is closed. This trapped air can cause "lightness" in the cured tire. One known method of evacuating this trapped air is through the use of vents. Vents are added in the mold and bead rings to bleed the air during the curing process. The vents are either directly drilled through the mold or bead rings, or a hole is drilled through the mold or bead ring and a pre-formed insert or mold vent assembly is placed in the hole, thereby forming a vent.

During air evacuation, the elastomeric tire material may flow into the vents, creating projections on the surface of the tire known as sprues.

SUMMARY OF THE INVENTION

In one aspect a tire mold vent assembly is provided which includes a cylindrical vent housing having first and second ends, a cylindrical outer surface and a length from the first end to the second end. The housing has a slot defined in the outer surface along the length. The slot at least partially defines a passage through the housing. An elastomeric insert is received in the slot. The insert includes a head extending laterally adjacent the first end of the housing. The head is movable between a first position permitting air flow into the passage at the first end of the housing, and a second position at least partially blocking the passage at the first end of the housing.

In another aspect, a tire mold is provided comprising a mold body including an inner mold cavity surface and an outer mold cavity surface. The mold body includes a vent hole defined therein communicating the inner mold cavity surface and the outer mold surface. The vent hole has a hole diameter. A cylindrical vent housing is received in the vent hole. The housing has a first end and a second end, and includes a cylindrical outer housing surface having a slot defined therein along a length of the housing. The housing has an unrestricted housing outside diameter greater than the hole diameter. The housing is resiliently deformed across the slot when the housing is received in the vent hole. An insert is received in the vent housing. The insert is movable between a first position permitting air to vent through the vent hole, and a second position inhibiting sprue formation through the vent hole.

In any of the above embodiments the cylindrical outer surface of the vent housing may include threads and the vent housing may have a tool slot extending across the first end of the housing such that a tool may be used to turn the housing to aid in placement of the housing within the vent hole of the mold. The threads on the cylindrical outer surface of the vent housing also provide an auxiliary pathway for airflow.

In any of the above embodiments the vent housing is relatively more rigid than is the elastomeric insert.

In any of the above embodiments the slot in the vent housing provides flexibility such that a circumference of the vent housing can be reduced.

In any of the above embodiments the head of the elastomeric insert may comprise a disc substantially covering the first end of the housing.

In any of the above embodiments the slot may extend radially to at least a central axis of the housing.

In any of the above embodiments the elastomeric insert may comprise a stem or rod having a first end and a second end, with the head attached to the first end. An anchor may extend laterally from the second end of the rod such that the rod is restrained lengthwise with the slot of the housing.

In any of the above embodiments the elastomeric insert may comprise a tapered support piece, or elastomeric spring portion, at an intersection of the head and the first end of the rod. The tapered support piece is flexible to allow the head to move from the first position to the second position.

In any of the above embodiments the tapered support piece may comprise a plurality of flexible gussets placed at intervals around the first end of the rod.

In any of the above embodiments the first end of the housing may include a tapered recess complementary to the tapered support piece of the elastomeric insert such that the tapered support piece can be supported by the tapered recess.

In any of the above embodiments the head may be disc shaped having a disc thickness, and in the first position the head is spaced from the first end of the housing by a distance greater than the disc thickness.

In any of the above embodiments the elastomeric insert may comprise a resiliently flexible portion configured to permit the head to be moved from the first position to the second position by an external force, and to return the head to the first position upon removal of the external force.

In any of the above embodiments the first end of the vent housing may be recessed within the hole of the tire mold away from the inner mold cavity surface. In the first position the head of the insert may extend out of the hole past the inner mold cavity surface, and in the second position the head may be flush with the inner mold cavity surface.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 5 is a side view of the cylindrical vent housing of the mold vent assembly of FIG. 2.

FIG. 6 is an inner end view of the vent housing of FIG. 5.

FIG. 6A is a view similar to FIG. 6 showing an alternative design of the vent housing having a distinct axial bore joining the slot.

FIG. 7 is an outer end view of the vent housing of FIG. 5.

FIG. 8 is a sectioned view of the vent housing of FIG. 5 taken along line 8-8 of FIG. 6.

FIG. 14 is a view similar to FIG. 5 showing an alternative embodiment of the vent housing having an external threaded portion and a slotted end.

FIG. 15 is an inner end view of the alternative vent housing of FIG. 14 showing the slotted end.

FIG. 16 is a view similar to FIG. 8 showing another alternative embodiment of the vent housing.

DETAILED DESCRIPTION

Certain terminology will be used in the following description for convenience and reference only and will not be limiting. The terms "inwardly" or "inward" and "outwardly" or "outer" will refer to directions toward and away from, respectively, the interior of the tire mold cavity. All the foregoing terms mentioned above include the normal derivative and equivalents thereof.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Figure 1:
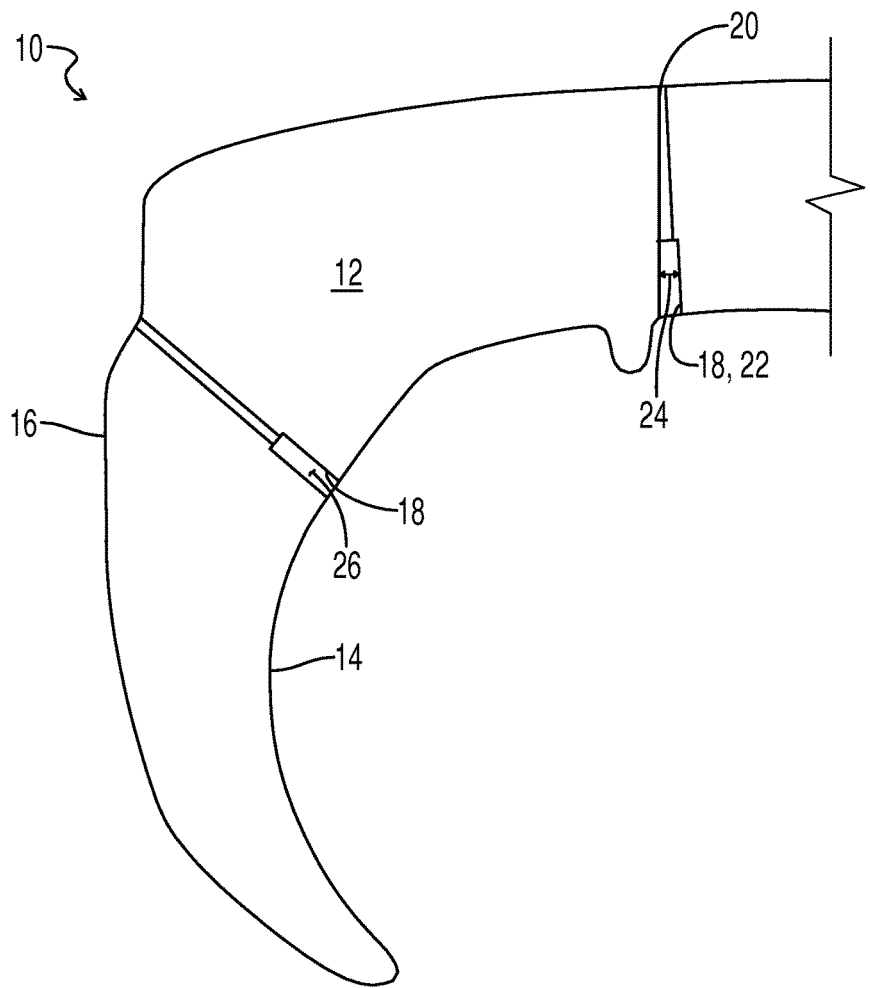
FIG. 1 is a schematic cross-section view of a tire mold schematically illustrating two vent holes formed through the tire mold from the inner mold cavity surface to the outer mold surface, with mold vent assemblies in accordance with the present invention in place within the vent holes.

FIG. 1 illustrates a tire mold 10 having a mold body 12 which includes an inner mold cavity surface 14 and an outer mold surface 16. The mold body 12 includes a plurality of vent holes 18 defined therein communicating the inner mold cavity surface 14 and the outer mold surface 16. The vent holes may be located in the tread portion, sidewall portion, and/or bead ring portion of the mold. Each of the vent holes 18 may include an outer bore portion 20, and an inner counter-bore portion 22. The inner counter-bore portion 22 has a hole diameter 24 for receiving a mold vent assembly 26.

Typical vent hole diameters which may be utilized are in the range from 0.062 inch diameter up to 0.125 inch diameter, although the invention is not limited to those diameters.

Figure 2:
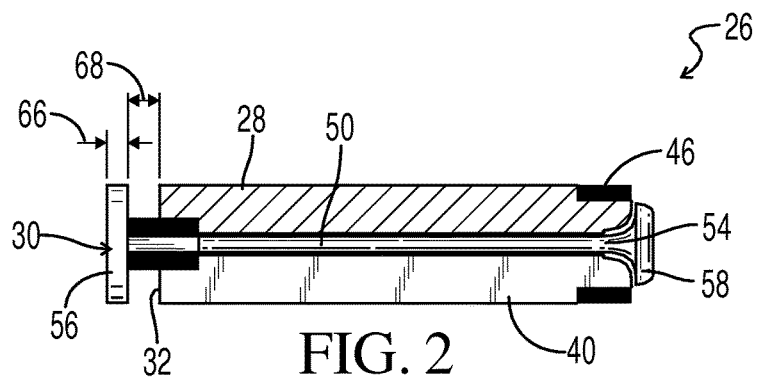
FIG. 2 is a lengthwise sectioned view of the mold vent assembly.

The mold vent assembly 26 is best seen in FIG. 2. Mold vent assembly 26 includes a cylindrical vent housing 28 and an elastomeric insert 30.

The vent housing is separately shown in FIGS. 5-8. Vent housing 28 includes a first or inner end 32 and a second or outer end 34. Vent housing 28 includes a generally cylindrical outer surface 36 and has a length 38 from its first end 32 to its second end 34. The vent housing 28 has a slot 40 defined in the outer surface 36 along the length 38. As is best seen in FIGS. 6 and 7, the slot 40 at least partially defines a passage through the housing 28. The slot 40 may extend radially at least to a central axis 43 of the cylindrical vent housing 28.

As compared to many prior vent designs, the vent assembly 26 disclosed herein provides a relatively greater cross-sectional area for air flow, due to the substantial cross-sectional area of the slot 40.

As is further described below, the slot 40 provides a flexibility to the vent housing 28 such that a circumference 44 of the vent housing 28 can be reduced by circumferentially compressing the vent housing 28 to reduce the slot opening 40.

The vent housing 28 may have an outer tapered portion 46 adjacent its inner end 34 to aid in placement of the vent assembly 26 in the vent hole 18 of the tire mold 10.

Adjacent the inner end 32 of vent housing 28 a tapered recess 48 may be formed, which as further described below will aid in supporting the elastomeric insert 30.

Figure 9:
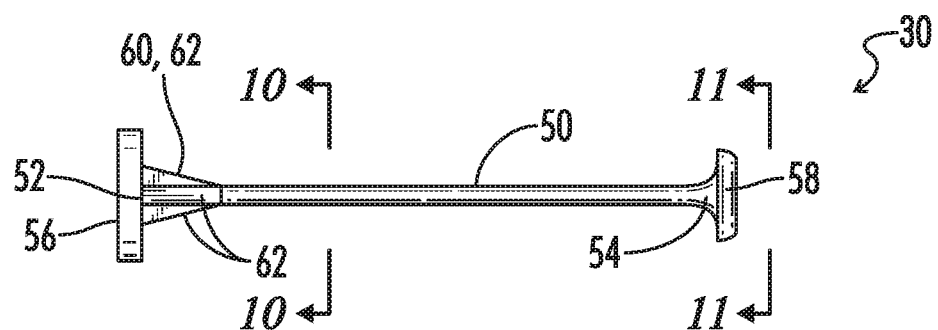
FIG. 9 is a side elevation view of the elastomeric insert of the mold vent assembly of FIG. 2.
Figure 10:
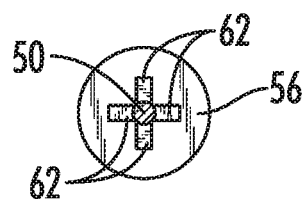
FIG. 10 is a sectioned view taken along line 10-10 of FIG. 9.
Figure 11:
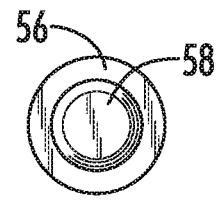
FIG. 11 is an outer end view taken along line 11-11 of FIG. 9 of the insert of FIG. 9.

The details of the elastomeric insert 30 are best shown in FIGS. 9-11. The insert 30 may include an elongated stem or rod 50 having a first or inner end 52 and a second or outer end 54. A head 56 which is preferably disc shaped is formed on the first end 52, and an anchor 58 is formed on and extends laterally from the second end 54 of the rod 50. The disc shaped head 56 may be referred to as a button shaped head or button insert.

The elastomeric insert 30 may include a tapered support piece 60, which may also be referred to as a resiliently flexible portion or an integral resilient spring portion 60, at the intersection of the head 56 and the first end 52 of the rod 50. As best seen in FIGS. 9 and 10, the resiliently flexible portion 60 may include a plurality of flexible flutes or gussets 62 placed at intervals around the first end 52 of rod 50. In the embodiment shown in FIGS. 9 and 10 the gussets 62 are placed at 90° intervals around the rod 50, but other arrangements could be utilized. The tapered support piece 60 is configured to compress to allow the insert 30 to move to the second position of FIG. 4 when a tire is molded in the mold, and to return the insert 30 to the first position of FIG. 3 when the mold is open and the tire is removed from the mold.

Figure 10A:
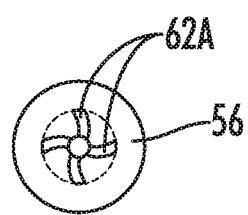
FIG. 10A is a view similar to FIG. 10 showing an alternative design for the flutes of the resilient spring portion of the insert.

The flutes 62 may be in the straight triangular shapes illustrated in FIG. 9, or alternatively the flutes 62 could be formed in a spiral arrangement so as to curve around the longitudinal axis of the stem 50. Such a spiral arrangement will aid in controlling the collapsed shape of the resilient spring portion 60 as the head 56 moves from its open position to its closed position. Such an alternative spiral shaped arrangement for the flutes 62, designated as 62A, is shown in FIG. 10A.

To create the mold vent assembly 26 shown in FIG. 2, the elastomeric insert 30 is placed through the slot 40 into the position shown in FIG. 2, wherein the rod 50 of insert 30 is substantially concentric with the central axis 43 of the vent housing 28. In the position shown in FIG. 2, the head 56 of elastomeric insert 30 is in its first or open position relative to the housing 28, which also corresponds to the position of FIG. 3. The disc shaped head 56 has an outer diameter slightly less than the inside diameter 24 of vent hole 18, so that when the head 56 is moved to its second position as shown in FIG. 4, the head 56 can be closely received within the vent hole 18.

In the assembly shown in FIG. 2, the slot width and stem diameter are substantially equal. The slot width may also be greater than the stem diameter and the insert will still be held in place by the anchor end 58 and by the complementary fitting of the tapered elastomeric spring portion 60 within the tapered recess of the vent housing.

The slot performs several functions in the assembly 26. First, the slot 40 allows assembly of the insert 30 with the vent housing 28. Second, the slot provides the circumferential resilience of the vent housing 28 to allow it to be radially or circumferentially compressed so that it can be easily fitted within the counter bore 22 of vent hole 18. Third, the slot 40 provides the primary passage through the vent housing 28 to allow for air to vent through the length of the vent housing 28.

It is noted that the slot 40 may also be formed in combination with a distinct axial bore or axial passage through the housing 28. Especially if the housing 28 is to be manufactured from tubing, with a slot 40 then machined in the tubing, an arrangement such as shown in FIG. 6A will result wherein the machine slot 40 joins a distinct axial bore 39 with the slot 40 and the bore 39 collectively defining a slot or passage through the housing 28.

In the assembled view of FIG. 2, it is seen that the anchor 58 extends laterally from the second end 54 of insert 30 such that the insert 30 and the rod 50 thereof is restrained lengthwise within the slot 40. In FIGS. 9 and 11, the anchor 58 is shown as a button shaped or disc shaped anchor 58.

Figure 11A:
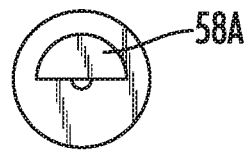
FIG. 11A is a view similar to FIG. 11 showing a first alternative embodiment of the anchor end of the elastomeric insert.
Figure 11B:
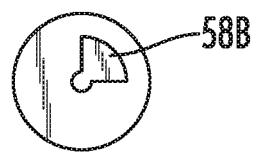
FIG. 11B is a view similar to FIG. 11 showing a second alternative embodiment of the anchor end of the elastomeric insert.

In FIG. 11A, an alternative anchor 58A is shown which has the shape of a half disc. In FIG. 11B, another alternative anchor design is shown and designated as 58B, in the form of a quarter shaped disc. Other shapes for the anchor 58 could be provided, and it is only necessary that there be some laterally extending portion that will restrain the insert 30 lengthwise so that it is held in place within the slot 40 of the vent housing 28. Alternative anchor shapes provide the option to install or replace insert 30 into vent housing 28, while vent housing 28 is already installed into the tire mold.

The slot 40 may be flared as indicated at 41 adjacent the outer end 34 of vent housing 28 to be complementary to the shape of the anchor 58.

Figure 3:
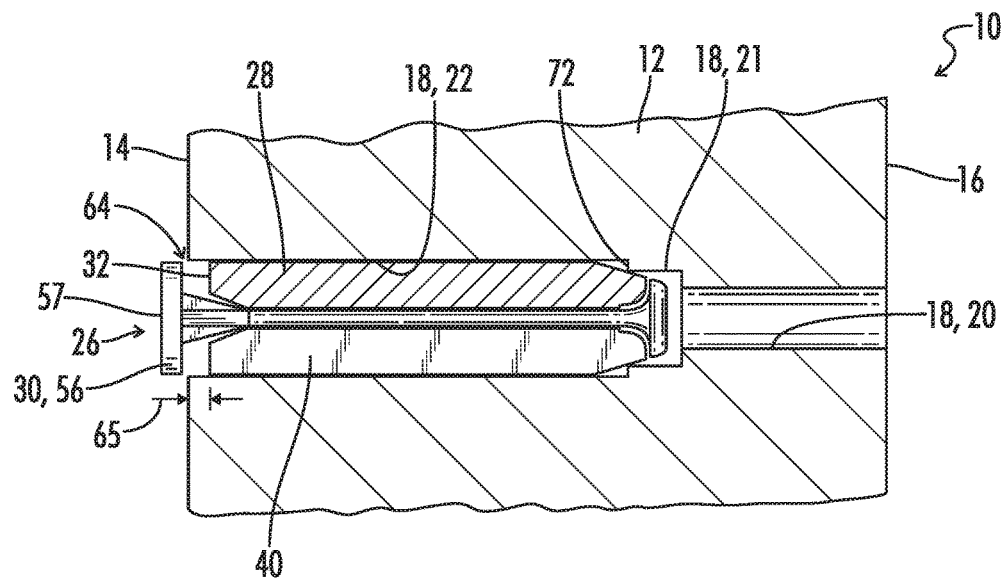
FIG. 3 illustrates the mold vent assembly of FIG. 2 in place within the tire mold of FIG. 1, with the elastomeric insert in its first or open position so as to allow air flow through the mold vent assembly and through the vent hole of the tire mold.
Figure 4:
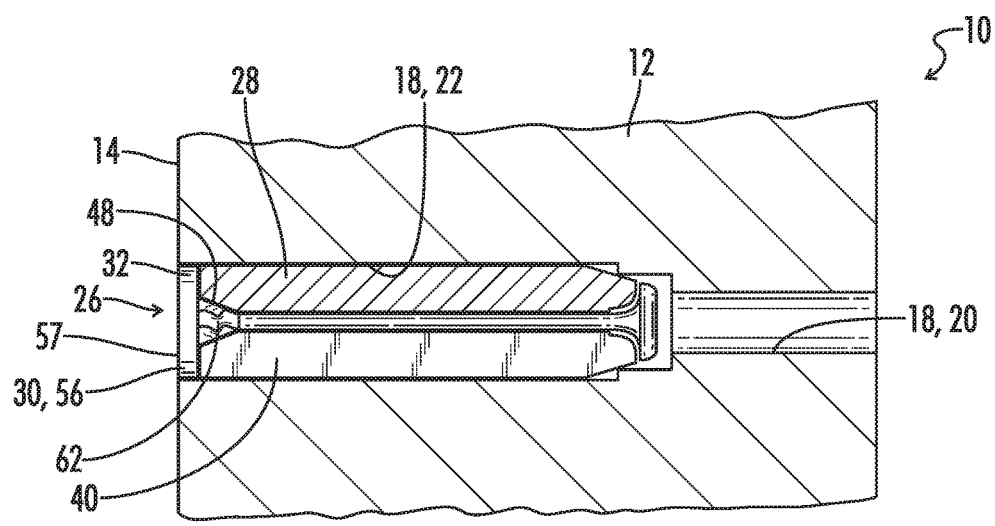
FIG. 4 is a view similar to FIG. 3 showing the mold vent assembly in the second or closed position so as to block the passage through the vent assembly to prevent sprue formation.

Referring now to FIGS. 3 and 4, the mold vent assembly 26 is shown in place within the inner counter bore 22 of vent hole 18 in the mold body 12 of tire mold 10. In FIG. 3, the head 56 of the elastomeric insert 30 is shown in a first position which permits air flow into the slot or passage 40 of the vent housing 28. In FIG. 4, the head 56 is shown in a second position which at least partially blocks the passage 40 at the first or inner end 32 of the vent housing 28. Preferably the head substantially covers the first end 32 of the housing 28 and substantially completely blocks the passage 40 when in its second position of FIG. 4.

As will be further described below, the movement of the head 56 from its first position of FIG. 3 to its second position of FIG. 4 is caused by the inflation of a bladder (not shown) which expands a green tire (not shown) within the inner mold cavity 14 of the tire mold 10 when the tire mold 10 is closed in a mold press and during the curing cycle of the tire. Thus as the green tire is expanded against an inner side 57 of head 56, the head 56 is pushed by the expanding green tire from its first position of FIG. 3 to its second position of FIG. 4. The movement of the head 56 is permitted by the resilient flexible portion 60 of the elastomeric 30 which collapses from its extended position as shown in FIG. 3 to a collapsed position as shown in FIG. 4 wherein the gussets 62 have deformed as they are compressed between the inwardly moving head 56 and the supporting tapered recess 48 of vent housing 28. The force applied against the head 56 by the expanding green tire may be referred to as an external force which moves the head 56 from the first position of FIG. 3 to the second position of FIG. 4.

Upon the opening of the mold press and the tire mold 10, and the removal of the green tire therefrom, the resiliently flexible portion 60 of elastomeric insert 30 will expand and return the head 56 back to the first position of FIG. 3. This allows air flow for the next cure cycle so that as a multitude of tires are sequentially formed and cured in the mold, the elastomeric insert will repeatedly move between its open position of FIG. 3 to allow air to vent as the molding process is initiated, to its closed position of FIG. 4 to subsequently prevent sprue formation during the curing process, and then to return to its open position of FIG. 3 when the tire is removed from the mold so that the vent assembly 26 is in position to allow air flow during the next cure cycle for the next tire.

It is noted that in the first position of FIG. 3, the head 56 is spaced inward from the inner mold surface 14 thus providing a spacing or air gap 64 therebetween which will allow air flow from inside the mold cavity to flow through the space 64 then through the passage 40 and out through the vent hole 18. The air gap 64 is eliminated when the head 56 moves to its second or closed position of FIG. 4.

Once the green tire has expanded to the point that it forces the head 56 to the second position of FIG. 4, the head 56 substantially closes the passage 40 thus preventing any subsequent flow of tire material into the passage 40 and thus preventing sprue formation.

As is best seen in FIG. 2, the disc shaped head 56 has a disc thickness 66, and in the first position of FIGS. 2 and 3, the head 56 is spaced from the inner end 32 of housing 28 by a distance 68 which is greater than the disc thickness 66. The vent housing 28 is recessed by a recess distance 65 (see FIG. 3) below the inner mold surface 14, which is preferably equal to disc thickness 66.

This spacing then allows the vent assembly 26 to be placed within the tire mold 10 as shown in FIG. 3. This provides the space or gap 64 between the head 56 and the inner mold cavity surface 14 as shown in FIG. 3 thus permitting air flow into the vent assembly 26 when the head 56 is in its first position of FIG. 3. Because the head thickness 66 is equal to the depth 65 by which the vent housing 28 is inset within the vent hole 18, when the head 56 is in its second position as shown in FIG. 4 the inner head surface 57 is substantially flush with the inner mold cavity surface 14, so as to provide a continuous smooth surface for supporting the green tire during the curing process, thus substantially preventing the formation of any unattractive discontinuities in the outer molded surface of the green tire.

Alternatively the inner head surface 57 may be below the inner mold cavity surface 14 when in its second position.

As will be appreciated by those skilled in the art, when assembling a conventional tire mold vent within a vent hole of a tire mold, wherein the conventional tire mold vent has a continuous cylindrical outer housing, the inner diameter 24 of the vent hole and the outside diameter of the vent must be carefully controlled so that a close interference fit of the vent within the vent hole can be accomplished. With the mold vent assembly of the present invention, however, wherein the vent housing is slotted so that the housing can be resiliently deformed across the slot to allow the housing to be received within the vent hole, the manufacturing process is much easier, because it is not necessary to so closely control the relative diameters of the vent hole 18 and the outer housing diameter of the vent assembly. Thus, the vent housing 36 is constructed so that in its relaxed or undeflected position as shown in FIGS. 5-8, the vent housing has an unrestricted housing outside diameter 70 which is greater than the hole diameter 24.

Then, when it is desired to place the vent assembly 26 into the vent hole 18, the tapered end 46 of vent housing 28 is placed into the counter bore 22 of vent hole 18, and the vent assembly 26 may be tapped into place with a mallet or hammer or any other suitable tool. As the tapered end 46 moves into the vent hole 18, 22, the vent housing 28 will be circumferentially compressed and resiliently deformed across the slot 40 so that the outside diameter of the vent housing 28 conforms to the inside diameter 24 of vent hole 18, 22 and the vent assembly 26 will be resiliently restrained in place within the vent hole 18, 22 by the radially outward resiliency of the vent housing 28.

As is seen in FIG. 3, the longitudinal position of the vent housing 28 within the vent hole 18, 22 may be controlled by constructing the relative shapes of the vent hole 18 and the vent housing 28 so that the vent housing 28 will encounter an abutment with an abutment surface 72 defined within the vent hole 18 so as to provide the desired recess 65 of the vent housing 28 within the mold body 12.

In the embodiment illustrated in FIGS. 3 and 4, the abutment surface 72 is formed by providing an intermediate bore portion 21 of the vent hole 18 between the bore 20 and counter bore 22. It is noted that the abutment surface 72 is configured such that air flowing through the passage 40 may flow past the anchor end 58 of elastomeric insert 30 and into and through the bore portion 20 of vent hole 18.

It will be appreciated that the vent housing 28 should be constructed from a relatively rigid or stiff material which is more rigid than the elastomeric insert 30. For example, the vent housing 28 may be made from thermoplastics, stainless steel, steel, aluminum or other such relatively rigid materials. The elastomeric insert 30, on the other hand, should be substantially more compressible and elastic than is the material of the vent housing, and may for example be made from relatively more elastic thermoplastics, rubber, or the like. Vent housing 28 material and elastomeric insert 30 material are also selected for their thermal properties, such that materials for these parts will not be adversely affected by the temperatures used in the curing process.

EXAMPLE

The following example could be used with a vent hole 18 having a bore diameter 20 of 0.090 inch and a counter bore diameter 22 of slightly less than 0.125 inch. In one example, the vent housing 28 may have a length 38 of 0.500 inches with an unrestricted outside diameter 70 of 0.125 inches.

The slot 40 may have an unrestricted slot width 74 of 0.020 inches and may extend past the central axis 43 as shown in FIG. 6. The tapered recess 48 may have an included angle between opposed sides of the taper in a range of 50° to 60°, and as indicated in FIG. 8 may have a diameter 76 of approximately 0.070 inches adjacent the inner end 32 of housing 28.

The elastomeric insert 30 for use with the example vent housing 28 just described may have a rod or a stem diameter of approximately 0.020 inches so that it easily but closely fits through the slot 40 when inserted laterally therein. The head 56 will have an outside diameter of substantially the same as the housing 28 of 0.125 inches. The head 56 will have a head thickness 66 of 0.20 inches and in its first position will be spaced by a distance 68 of 0.030 inches so as to provide an air gap 64 of about 0.010 inches when the vent assembly 26 is installed in the tire mold 10 as shown in FIG. 3. The exemplary vent housing 26 may be formed by molding the same from a relatively hard thermoplastic material, or the same may be machined from stainless steel tubing having the slot 40 machined therein.

In the exemplary vent assembly 26 just described, the elastomeric insert 30 may be molded from a highly elastic rubber material. It is noted that the rubber material selected for the insert 30 should be compatible with and different from the rubber from which the green tire is formed so as to prevent adherence between the green tire and the elastomeric insert 30 during the molding and curing process of the tire.

Methods of Assembly and Use

Figure 12:
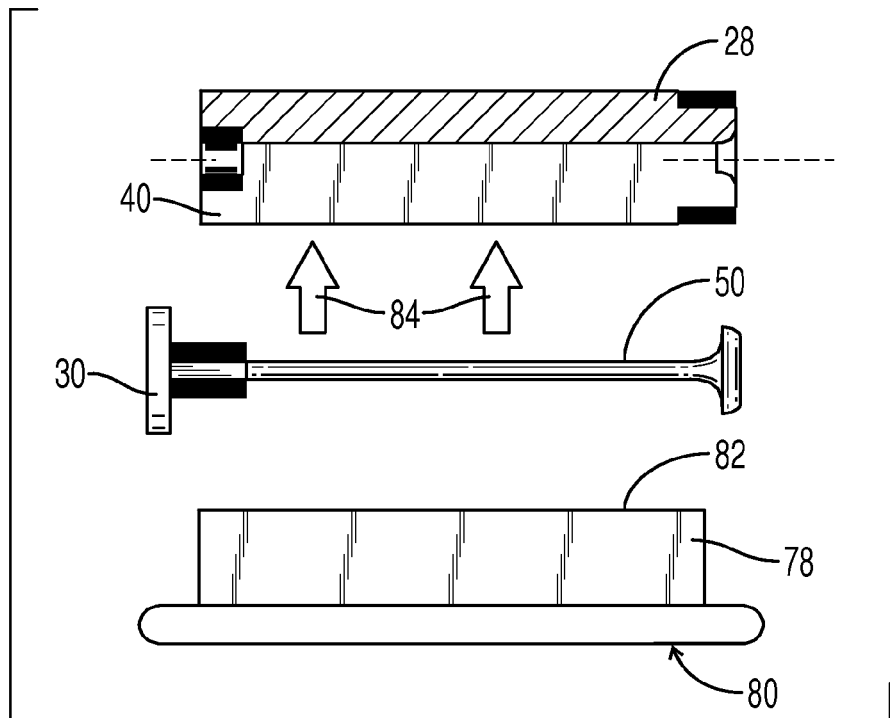
FIG. 12 is a schematic illustration of the method of assembly of the elastomeric insert with the vent housing.

To assemble the mold vent assembly 26 of FIG. 2, the elastomeric insert 30 may be laterally placed within the slot 40 of vent housing 28, by placing the rod 50 laterally adjacent the slot 40 and then moving the rod 50 laterally through the slot 40 into the position shown in FIG. 2 wherein the rod 50 is substantially coaxial with the vent housing 28. This assembly process is schematically illustrated in FIG. 12, showing the vent housing 28 in cross-section view with the slot 40 thereof aligned with the rod 50 of the elastomeric insert 30. A blade 78 of insert tool 80 may have a concavity formed in its inner edge 82 to engage and receive the rod 50 and push the same laterally into the slot 40 in the direction indicated by arrows 84. It will be appreciated that the flutes 62 of the resilient spring portion 60 are very small, thin and flexible and can be deformed so as to pass laterally through the slot 40 into their final position of FIG. 2.

After the vent assembly 26 is assembled as shown in FIG. 2 it is ready to be placed in the tire mold 10 as shown in FIG. 3. This is accomplished by placing the tapered end portion 46 of vent housing 28 within the inner end of counter bore 22 of vent hole 18 and then gently tapping the assembly with a mallet or other tool which will not damage the head 56 of insert 30 so as to force the vent housing 28 into the counter bore 22, resiliently compressing the vent housing 28 so as to slightly reduce its outside diameter as it moves into the counter bore 22 to the position shown in FIG. 3. Control of the axial position of the vent assembly 26 within the counter bore 22 may be provided by constructing the vent hole 18 to provide an abutment surface 72 as previously described which will interact with the tapered end 46 of vent housing 28 to limit the axially inward movement of vent housing 28 so as to control the depth of the recess 65 as desired.

Figure 13:
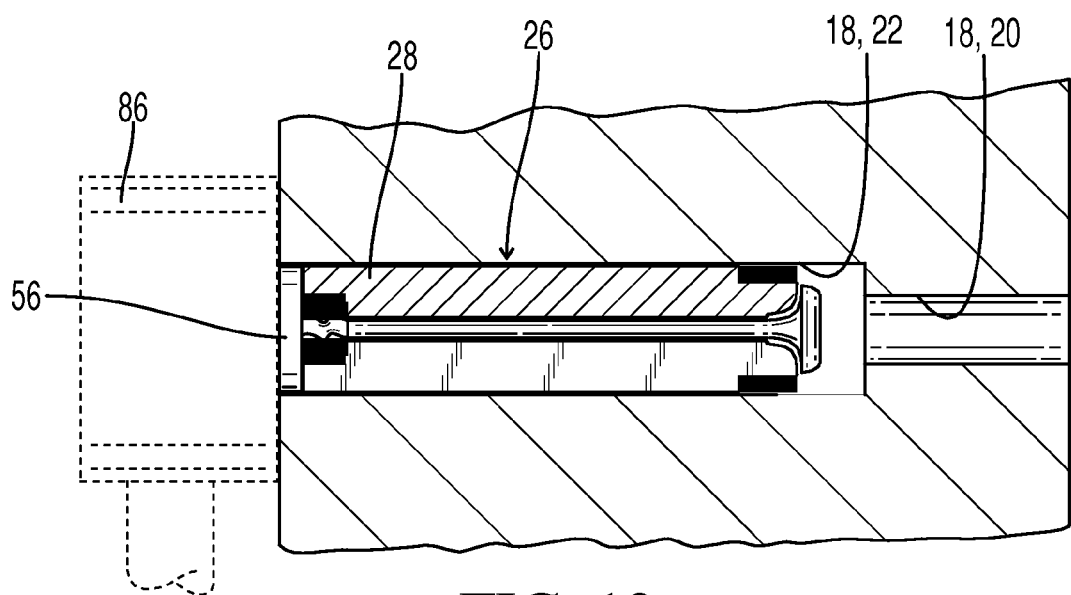
FIG. 13 schematically illustrates the use of a mallet to insert the vent assembly into the vent hole of the tire mold.

Alternatively, the abutment 72 may be eliminated and in an optional embodiment as shown in FIG. 13 the assembly 26 may be simply tapped into place with a mallet 86 until the head 56 of elastomeric insert 30 is flush with the inner mold cavity surface 14 when the head is moved to the compressed position by the mallet.

A further option for assembling the vent assembly 26 with the tire mold 10 may be provided by modifying the vent housing to the form shown as 28A in FIG. 14 wherein an axially inner portion 88 of the vent housing 28A has an external thread schematically indicated as 90 formed thereon. The inner end portion 32 of housing 28A, may then have a tool slot 92 formed therein for engagement by a flat end screwdriver or other suitable tool. It will be appreciated that any shaped recess could be used instead of the tool slot 92 for engagement with an appropriate complementary shaped tool. Thus the tool can engage the tool slot 92 and rotate the housing 28A to advance the housing 28A into the counter bore 22 of tire mold 10. External threads will also provide an auxiliary path for airflow, along the circumference of the vent housing, when the insert is in the first position.

It will be appreciated that when using the alternative embodiment of FIGS. 14 and 15, the vent housing 28A will be inserted into place within the tire mold 10 prior to assembly of the elastomeric insert 30 with the vent housing 28A. Then to assemble the elastomeric insert 30 with the vent housing 28A, it is necessary to insert the elastomeric insert 30 axially through the slot 40 to achieve its final position of FIG. 3. Due to the relatively great flexibility of the elastomeric insert 30, this can be accomplished with a needle shaped inserting tool (not shown) which engages the anchor end 58 of elastomeric insert 30 to either push or pull the elastomeric insert 30 axially into place within the vent housing 28A.

Another alternative design for the vent housing 28 is shown in FIG. 16 and designated as 28B. In the vent housing 28B, an inner end portion 94 of the housing has a slightly larger outside diameter than the outer end portion 96 of the housing. The outside diameter of the inner end portion 94 is selected so as to provide a resilient interference fit with the counter bore 22, and the outer portion 96 of the housing adjacent outer end 34 may have a small lead angle defined thereon to make it easier to insert the housing 28B most of the way into the counter bore 22 prior to final positioning by tapping the vent assembly 26 into place so that the inner portion 94 snugly engages the counter bore 22.

The manner of construction of the vent assembly 26 also permits easy field repairs of the vent assembly 26 after it has been placed within the tire mold 10, if for example one of the vent assemblies 26 is damaged during use and needs replacement of the vent insert 30. This repair preferably occurs by removing the vent assembly 26 from the vent hole 18, which can be accomplished by extending a thin rod through the vent hole 18 from the outside of the tire mold 18 to engage the vent assembly 26 and tap the same out of the counter bore 22. Then either a complete new vent assembly 26 may be placed in the counter bore 22, or the damaged vent assembly 26 can be repaired by stripping out the elastomeric insert 30 and replacing it with a new elastomeric insert. The ease of installation and removal and replacement of the present vent assembly allows molds to be repaired in the mold area rather than removing the mold to a workshop area for repair and replacement.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. In particular, while the present application illustrates a vent assembly for a tire mold, it should be understood that the vent assembly may be used in other types of molds. For example, the above described vent assembly may be employed in molds for other elastomeric products, such as air springs, rolled roofing, and other known elastomeric products. More broadly, the above described vent assemblies may be employed in molds for any molded products. Therefore, the application, in its broader aspects, is not limited to the specific details, the representative apparatus, and illustrative examples shown and described. Accordingly, departures may be made from such details without departing from the spirit or scope of the applicant's claimed invention.

What is claimed is:

1. A mold vent assembly, comprising:
   a cylindrical vent housing including first and second ends, a cylindrical outer surface and a length from the first end to the second end, the housing having a slot defined in the outer surface along the length, the slot at least partially defining a passage through the housing; and
   an elastomeric insert received in the slot, the insert including a head extending laterally adjacent the first end of the housing, the head being movable between a first position permitting air flow into the passage at the first end of the housing and a second position at least partially blocking the passage at the first end of the housing.

2. The mold vent assembly of claim 1, wherein the cylindrical outer surface of the vent housing further comprises threads and the vent housing has a tool slot extending laterally across the first end of the housing such that a tool may turn the housing.

3. The mold vent assembly of claim 1, wherein the vent housing is more rigid than the insert.

4. The mold vent assembly of claim 1, wherein the slot provides flexibility such that a circumference of the housing can be reduced.

5. The mold vent assembly of claim 1, wherein the head of the elastomeric insert comprises a disc substantially covering the first end of the housing.

6. The mold vent assembly of claim 1, wherein the slot extends radially at least to a central axis of the housing.

7. The mold vent assembly of claim 1, wherein the insert further comprises a rod having a first end and a second end, with the head attached to the first end.

8. The mold vent assembly of claim 7, wherein the insert further comprises an anchor extending laterally from the second end of the rod such that the rod is restrained lengthwise within the slot.

9. The mold vent assembly of claim 7, wherein the insert further comprises a tapered support piece at an intersection of the head and the first end of the rod, the tapered support piece being flexible to allow the head to move to the second position.

10. The mold vent assembly of claim 9, wherein the tapered support piece comprises a plurality of flexible gussets placed at intervals around the first end of the rod.

11. The mold vent assembly of claim 9, wherein the first end of the housing includes a tapered recess complementary to the tapered support piece such that the tapered support piece can be supported by the tapered recess.

12. The mold vent assembly of claim 1, wherein:
   the head is disc shaped and has a disc thickness; and
   in the first position the head is spaced from the first end of the housing by a distance greater than the disc thickness.

13. The mold vent assembly of claim 1, wherein:
the insert comprises a resiliently flexible portion configured to permit the head to be moved from the first position to the second position by an external force, and to return the head to the first position upon removal of the external force.

14. The mold vent assembly of claim 1, further comprising:
a tire mold including a mold body having an inner mold cavity surface and an outer mold surface, the mold body including a vent hole defined therein communicating the inner mold cavity surface and the outer mold surface, the vent hole having a hole diameter; and
wherein the cylindrical vent housing is received in the hole and the vent housing is circumferentially compressed such that the vent housing is resiliently restrained within the hole of the tire mold.

15. The mold vent assembly of claim 14, wherein:
the first end of the vent housing is recessed within the hole of the tire mold away from the inner mold cavity surface; and
in the first position the head of the insert extends out of the hole past the inner mold cavity surface and in the second position the head is flush with the inner mold cavity surface.

16. A tire mold, comprising:
a mold body including an inner mold cavity surface and an outer mold surface, the mold body including a vent hole defined therein communicating the inner mold cavity surface and the outer mold surface, the vent hole having a hole diameter;
a cylindrical vent housing received in the vent hole, the housing having a first end and a second end, the housing including a cylindrical outer housing surface having a slot defined therein along a length of the housing, the housing having an unrestricted housing outside diameter greater than the hole diameter, the housing being resiliently deformed across the slot when the housing is received in the vent hole; and
an insert received in the vent housing, the insert movable between a first position permitting air to vent through the vent hole, and a second position inhibiting sprue formation through the vent hole.

17. The tire mold of claim 16, wherein the outer housing surface further comprises threading such that the vent housing may be screwed into the vent hole and the vent housing has an inset on its first end such that a tool can engage the housing to rotate the housing.

18. The tire mold of claim 16, wherein the vent housing is received into the hole such that the first end of the housing is recessed from the inner mold cavity surface.

19. The tire mold of claim 18, wherein in the first position the insert protrudes from the hole beyond the inner mold cavity surface to define an air gap between the head and the mold.

20. The tire mold of claim 19, wherein in the second position the insert is flush with the inner mold cavity surface and the air gap is eliminated.

21. The tire mold of claim 16, wherein:
the insert includes an integral resilient spring portion configured to compress to allow the insert to move to the second position when a tire is molded in the mold, and to return the insert to the first position when the mold is opened and the tire is removed from the mold.

22. The tire mold of claim 21, wherein:
the integral resilient spring portion includes a plurality of tapered flutes.

23. The tire mold of claim 16, wherein:
the insert includes a disc shaped head extending from the first end of the vent housing.

24. The tire mold of claim 16, wherein:
the insert includes an anchor extending from the second end of the vent housing.

* * * * *